US009921823B2

(12) United States Patent
Gadgil et al.

(10) Patent No.: US 9,921,823 B2
(45) Date of Patent: Mar. 20, 2018

(54) LINE REPLACEMENT UNIT (LRU) REPLACEMENT PROCESS

(71) Applicant: Garmin International, Inc., Olathe, KS (US)

(72) Inventors: Anup A. Gadgil, Overland Park, KS (US); Mark W. Gepner, Tonganoxie, KS (US); Daniel H. Johnson, Chandler, AZ (US); David Lucero, Chandler, AZ (US); John D. Layman, Mission, KS (US); Justin T. Baird, Kansas City, MO (US); Roger A. Orf, Olathe, KS (US); Kevin J. Brewer, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 14/990,596

(22) Filed: Jan. 7, 2016

(65) Prior Publication Data

US 2016/0200455 A1 Jul. 14, 2016

Related U.S. Application Data

(60) Provisional application No. 62/101,612, filed on Jan. 9, 2015.

(51) Int. Cl.
*G06F 9/45* (2006.01)
*G06F 9/445* (2006.01)
(Continued)

(52) U.S. Cl.
CPC .......... *G06F 8/65* (2013.01); *G05B 19/042* (2013.01); *G06F 9/44505* (2013.01); *B64D 43/00* (2013.01)

(58) Field of Classification Search
CPC ... B64F 5/0081; B64D 43/00; G06F 9/44505; G06F 8/65
See application file for complete search history.

(56) References Cited

U.S. PATENT DOCUMENTS

| 6,438,468 B1 | 8/2002 | Muxlow et al. ................... 701/3 |
| 6,795,758 B2 | 9/2004 | Sinex ............................. 701/29 |

(Continued)

OTHER PUBLICATIONS

Garmin G1000® Integrated Flight Deck Pilot's Guide, http://statc.garmincdn.com/pumac/190-00498-07_0A_Web.pdf , published Oct. 2011.

(Continued)

*Primary Examiner* — Aaron L Troost
(74) *Attorney, Agent, or Firm* — Samuel M. Korte; Max M. Ali

(57) ABSTRACT

An improved integrated avionics system having a plurality of line replacement units (LRUs) is disclosed. At least one LRU stores in its memory software and configuration data stored and used by another LRU in the system. Upon detecting a new LRU installation, the at least one LRU may be configured to copy to its internal memory the software and configuration data loaded to the new LRU. The LRU may also store a table in its internal memory identifying each LRU that has been installed in the system, when each LRU was installed, and a copy of configuration and software data loaded to each LRU. If one of the LRUs in the system needs to be replaced, the LRU may determine which software and configuration data is applicable to the replaced LRU and load the determined software and configuration data to the new LRU, thereby improving the loading and installation process.

6 Claims, 8 Drawing Sheets

(51) Int. Cl.
    *G05B 19/042*     (2006.01)
    *B64D 43/00*     (2006.01)

(56) References Cited

U.S. PATENT DOCUMENTS

| | | |
|---|---|---|
| 7,151,985 B2 | 12/2006 | Tripmaker ................ 701/3 |
| 7,346,435 B2 | 3/2008 | Amendola et al. ........... 701/1 |
| 7,420,476 B2 | 9/2008 | Stiffler ................ 340/945 |
| 7,478,381 B2 | 1/2009 | Roberts et al. ........... 717/168 |
| 7,551,086 B2 | 6/2009 | Coop et al. ............ 340/572.1 |
| 7,636,568 B2 | 12/2009 | Gould et al. ............ 455/431 |
| 7,703,145 B2 | 4/2010 | Stelling et al. ............ 726/26 |
| 8,490,074 B2 | 7/2013 | Young et al. ............ 717/167 |
| 9,038,047 B2 | 5/2015 | Young et al. ............ 717/167 |
| 9,137,038 B1* | 9/2015 | Mazuk ............... G06F 11/14 |
| 2003/0208579 A1* | 11/2003 | Brady, Jr. ............ G06F 8/65 |
| | | 709/223 |
| 2005/0026486 A1* | 2/2005 | Thomas ............ G06F 9/4413 |
| | | 439/188 |
| 2006/0229772 A1 | 10/2006 | McClary ................ 701/3 |
| 2007/0027589 A1 | 2/2007 | Brinkley et al. ............ 701/3 |
| 2008/0140278 A1 | 6/2008 | Breed ................ 701/29 |
| 2010/0100970 A1* | 4/2010 | Roy-Chowdhury ...... G06F 8/71 |
| | | 726/30 |

OTHER PUBLICATIONS

Printout from https://en.wikipedia.org/wiki/Line-replaceable_unit, published prior to Jan. 7, 2016.

* cited by examiner

LINE REPLACEMENT UNIT (LRU) REPLACEMENT PROCESS

CROSS-REFERENCE TO RELATED APPLICATIONS

The priority benefit of U.S. Provisional Patent Application No. 62/101,612, entitled "Intelligent LRU Replacement System and Method," filed on Jan. 9, 2015, is claimed and the disclosure of which is hereby incorporated by reference in its entirety.

BACKGROUND

Complex electronic vehicular control systems, such as those used in aviation systems, often include one or more modular line replaceable units (LRUs) that may be interchanged to provide a desired system configuration and to enable quick replacement in the event of LRU failure or malfunction. Typically, a system may include an initial factory setup having several basic LRUs, while additional LRUs may be added to the system to provide customized functionality. For example, an autopilot or a satellite radio unit may be added to an aircraft, each requiring a respective LRU to be installed.

When an LRU is added to the integrated system, such as when a new LRU is added or when an LRU fails and needs to be replaced, for example, a technician or other user typically installs specific software and configuration data for the new LRU by connecting (electrically coupling) an external device (e.g., a laptop, a USB dongle, memory card, etc.) and then storing the software and configuration data to a LRU within the integrated system. For instance, the technician or other user may insert a physical memory loader card that includes software and configuration data for the new LRU. Therefore, a technician or other user typically needs to install the new LRU using the external device (e.g., an appropriate loader card specific to the new LRU) storing software and/or configuration settings that may need to be obtained from the manufacturer (e.g., downloaded from the manufacturer's website) and/or shipped to the technician or other user's location.

Furthermore, although a new LRU may be a modular hardware unit, the interplay between various LRUs within an integrated system may cause other LRUs to be affected when a new or replacement LRU is added to an existing system. That is, although only one new LRU may be installed, this LRU may require the cooperation of several other LRUs in the system to provide the desired functionality. Therefore, several other LRUs may need to be reconfigured and/or reprogrammed to facilitate operation of new options, inputs, outputs, and/or hardware associated with the new LRU.

If an LRU needs to be replaced after several new LRUs have been installed to an existing integrated system, the external device (e.g., a loader card for the replacement LRU) may be configured to alter the configuration and/or software of other LRUs in the system other than the LRU being replaced (e.g., setting them to some default state, turning off previously-set options that were enabled, etc.). Because each LRU installation or replacement may cause changes to other LRUs in the aviation system, alternations that are not properly tracked and accounted for may cause the aviation system to operate in a manner that is not desirable. To remedy this, a logbook or other recordkeeping procedure is typically utilized by technicians to maintain a record of all changes performed to the software and configuration data for all LRUs in the system for review. A technician or other user may reference this event history to locate the content that was loaded when each LRU was added, which may require loading software and configuration data from when the original factory software and configuration data were loaded, and then loading additional software and configuration data in the order that each of the LRUs were added to the factory-certified system. This potentially requires a technician or other user to locate the appropriate software and configuration data as well to perform several loading procedures, thereby making the replacement of a single LRU an arduous, complex, and tedious process.

SUMMARY

Embodiments of the present technology relate generally to an integrated avionics system having LRUs, more particularly, to an improved integrated avionics system that internally stores a copy of software and configuration data that is loaded on one or more LRUs on another LRU in the integrated avionics system. The LRU may be configured to store the software and configuration data as new LRUs are installed into the integrated avionics system and to maintain a log of installation data to facilitate an improved determination of current software and configuration data versions and installation of replacement LRUs without devices external to the integrated avionics system.

Embodiments are disclosed describing an LRU system that is utilized as part of an aircraft system having an integrated avionics system. However, it is to be understood that the described embodiments of the LRU system may be utilized for any application that implements an integrated LRU system to perform one or more specific functions, such as aircraft, marine vessels, spacecraft, automobiles, etc.

In some embodiments, the integrated avionics system may include one or more LRUs that are configured to load configuration and software data stored in the one or more LRUs to a newly installed LRU. The one or more LRUs configured to store the software and configuration data may monitor loading processes of new LRUs as each is installed in the integrated avionics system and, when loading is observed, copy the software and configuration data used in the installation process to an internal memory of the one or more LRUs to provide a backup of the software and configuration files in the integrated avionics system. The one or more LRUs may be further configured to store a copy of the software and configuration data with details of all software and configuration changes made to other LRUs in the integrated avionics system in a log file stored in an internal memory of each of the one or more LRUs. The one or more LRUs may store in an internal memory this software and configuration data in a format such that an identity of each LRU may be correlated with the changes made and the time when the changes were made, together with any applicable software and configuration data copies. The one or more LRUs may subsequently backup this data to one or more other LRUs when instructed or periodically and verify the suitability of each stored software and configuration data file by utilizing and performing an integrity check process.

In other embodiments, once software and configuration data is installed to a new LRU from an external device, such as a loader card, all of the content required to transfer and install the software and configuration files from the external device to the new LRU is copied to the internal memory of one or more LRUs in the integrated avionics system. The stored content, which includes the software and configuration data, may be used by an LRU of the integrated avionics system to transfer and install the software and configuration files to another LRU when the new LRU is subsequently replaced in the future. That is, upon an LRU being replaced, a user may interact with an input/output interface (e.g., hard buttons or a touch screen associated with a user interface presented on a display of an LRU) of an LRU to navigate to the appropriate option to install the replacement LRU using the copied configuration and software data stored in the internal memory of one or more LRUs. In embodiments, the LRU having the input/output interface may store in its internal memory the software and configuration files that the user intends to transfer and install on the new LRU that is replacing an LRU that has been removed from the integrated avionics system. The one or more LRUs storing the software and configuration data may identify the LRU being replaced and reference the historical data to build a list of configuration and software data applicable to the replaced LRU to aid the user with replacing the LRU. The one or more LRUs may facilitate the transfer and installation of the software and configuration data on the replacement LRU by communicating the configuration and software data in the built list to the replacement LRU and any applicable LRUs in the system, thereby maintaining the configuration and software data present at the time the LRU was replaced without the use of an external device that was originally used to install and configure the LRU that is being replaced.

This summary is provided to introduce a selection of concepts in a simplified form that are further described below in the detailed description. This summary does not necessarily identify key features or essential features of the claimed subject matter, nor does it limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1A:
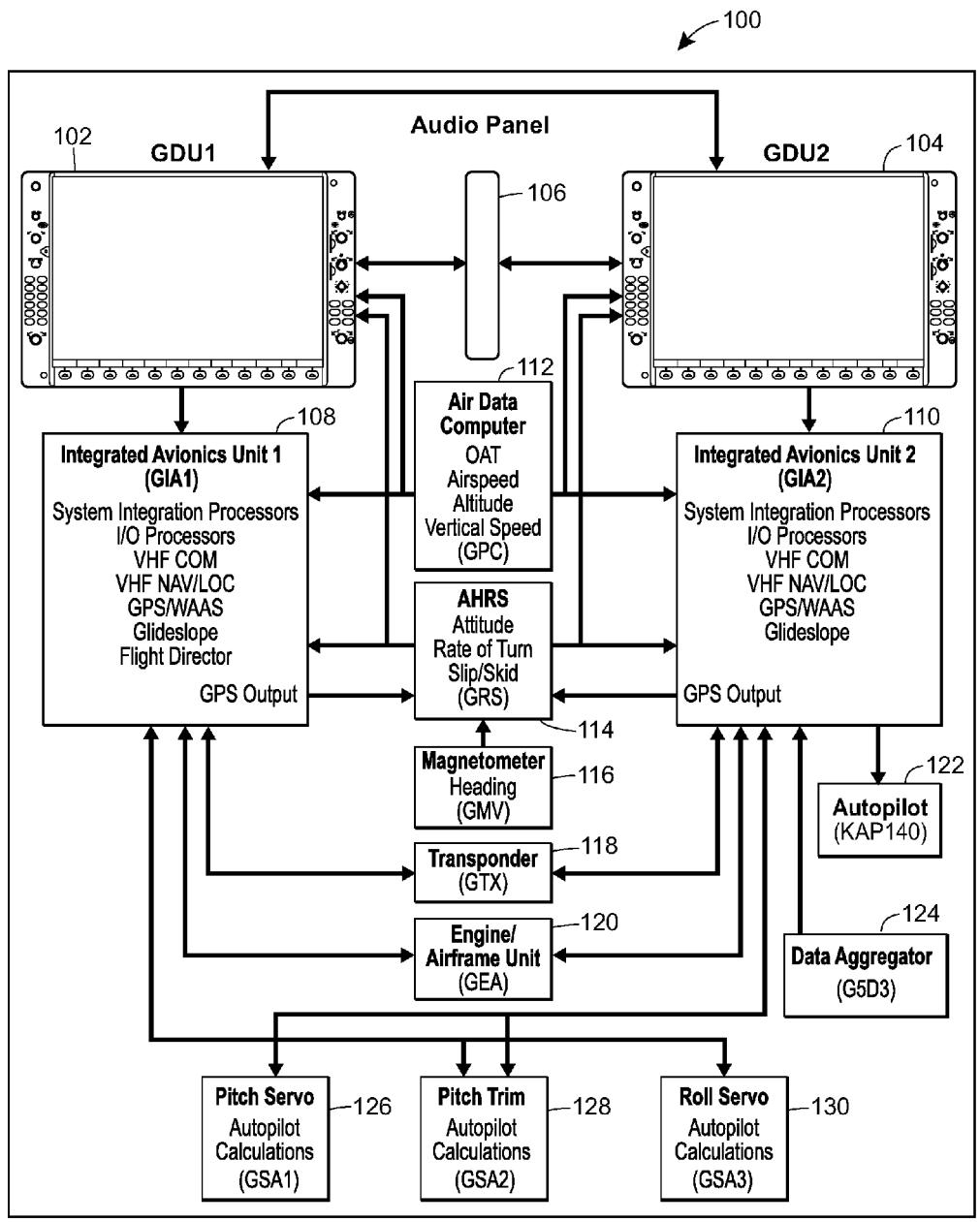
FIG. 1A is an illustration of a block diagram of an exemplary initial integrated flight deck system 100 in accordance with an embodiment of the present disclosure.

FIG. 1A is an illustration of a block diagram of an exemplary initial integrated flight deck system 100 in accordance with an embodiment of the present disclosure. Initial integrated flight deck system 100 may include a primary LRU 102, a secondary LRU 104, and various other LRUs that may be installed with an aircraft upon manufacture and certified with the aircraft. For example, as shown in FIG. 1A, initial integrated flight deck system 100 may include an audio panel LRU 106, integrated avionics unit LRUs 108 and 110, an air data computer LRU 112, an altitude and heading reference system (AHRS) LRU 114, a magnetometer LRU 116, a transponder LRU 118, an engine/airframe unit LRU 120, an autopilot system LRU 122, a data aggregator LRU 124, a pitch servo LRU 126, a pitch trim LRU 128, and a roll servo LRU 130.

In accordance with an embodiment, primary LRU 102 may be configured to communicate with secondary LRU 104 and/or one or more other LRUs installed in initial integrated flight deck system 100 (e.g., audio panel LRU 106, integrated avionics unit LRUs 108 and 110, air data computer LRU 112, AHRS LRU 114, magnetometer LRU 116, transponder LRU 118, engine/airframe unit LRU 120, autopilot system LRU 122, data aggregator LRU 124, pitch servo LRU 126, pitch trim LRU 128, roll servo LRU 130, etc.) to read data from and/or write data to these other LRUs in accordance with any suitable number and/or type of communication protocols. For example, each of the LRUs in initial integrated flight deck system 100 may be communicatively coupled to one another via Ethernet connection, and primary LRU 102 may be configured to read data from and/or write data to one or more of these LRUs in accordance with an Ethernet protocol. In embodiments, a combination of communication protocols may be utilized by one or more processors in the flight deck system 100 to implement the functionality disclosed herein. For instance, to effectuate communications requiring a multiple communication protocols, a first communication protocol (e.g., HSDB) may be utilized to communicate with a first LRU and a second communication protocol (e.g., RS-232 serial communication) may be utilized by the first LRU to communicate information to a second LRU, effectively forming a multi-protocol communication path.

As shown in FIG. 1A, LRU 102 may correspond to a first Graphical Display Unit (GDU1), while secondary LRU 104 may correspond to a second Graphical Display Unit (GDU2). Either GDU1 or GDU2 may function as the primary source of flight information for a pilot, and either GDU1 or GDU2 may interchangeably serve as a primary flight display (PFD) or a multi-function display (MFD). By providing two separate GDUs, redundancy is introduced as a failsafe so that a pilot may continue to receive critical flight information in the event that one of the GDUs fails. Although each GDU may act as a backup for the other, one GDU may be referred to as a "primary" device, which is preferably used by the pilot, while another GDU may be used as a "secondary or backup GDU. Therefore, LRU 102 is referred to herein as primary LRU 102, which may be implemented as a primary flight display device (e.g., GDU1), while secondary LRU 104 may be implemented as a multifunction display (e.g., GDU2).

When implemented as a primary flight display device, primary LRU 102 may include a display to facilitate various tasks used by a pilot when operating an aircraft in which initial integrated flight deck system 100 is installed. For example, LRU 102 may display navigational information, altitude, airspeed, vertical speed, air pressure readings, heading, an attitude indicator, etc.

Primary LRU 102 may also include an internal memory and one or more memory card readers to facilitate loading software and configuration data from an external device or memory card when the integrated flight deck system 100 is initially setup at the factory. It is to be understood that wireless communication techniques (e.g., Wi-Fi, Bluetooth, etc.) may also be utilized to load software and configuration data to LRU 102. Upon initially setting up initial integrated flight deck system 100 via a load procedure utilizing one or more external devices, this software and configuration data may be copied and stored in primary LRU 102's internal memory, which may be later accessed and used if one of the LRU's in initial integrated flight deck system 100 needs to be replaced. In this way, external devices are not needed once the configuration and software data is copied to the internal memory of LRU 102 from an external device. The details of this loading procedure are further discussed below with reference to FIG. 2.

Similar to primary LRU 102, secondary LRU 104 may be configured to communicate with primary LRU 102 and/or one or more other LRUs installed in initial integrated flight deck system 100 (e.g., audio panel LRU 106, integrated avionics unit LRUs 108 and 110, air data computer LRU 112, AHRS LRU 114, magnetometer LRU 116, transponder LRU 118, engine/airframe unit LRU 120, autopilot system LRU 122, data aggregator LRU 124, pitch servo LRU 126, pitch trim LRU 128, roll servo LRU 130, etc.) to read data from and/or write data to these other LRUs in accordance with any suitable number and/or type of communication protocols. For example, secondary LRU 104 may be configured to read data from and/or write data to primary LRU 102 and/or one or more other LRUs installed in initial integrated flight deck system 100 in accordance with an Ethernet protocol.

When implemented as a multifunction display device, secondary LRU 104 may include a display to facilitate various tasks used by a pilot when operating an aircraft in which initial integrated flight deck system 100 system is installed. For example, secondary LRU 104 may be used in concert with a primary LRU 102 and present data such as a navigation route, a moving map, weather radar, Next-Generation Radar (NEXRAD), ground proximity warning system (GPWS), traffic collision avoidance system or traffic alert and collision avoidance system (TCAS), airport information, etc.

Like primary LRU 102, secondary LRU 104 may also include one or more memory card readers to facilitate loading software and configuration data from an external device (e.g., a secure digital (SD) memory card) when initial integrated flight deck system 100 is initially setup at the factory. Secondary LRU 104, like primary LRU 102, may copy and store software and configuration data from one or more external devices used in a loading procedure, which may be later accessed and used in lieu of external device s when the LRU needs to be replaced. Additionally or alternatively, secondary LRU 104 may communicate with primary LRU 102 to store a copy of any suitable portion of data in primary LRU 102's internal memory. In this way, secondary LRU 104 may act as a backup for any data stored in primary LRU 102, which may be particularly useful, for example, if primary LRU 102 needs to be replaced. The details of this procedure are further discussed below with reference to FIG. 2.

Figure 1B:
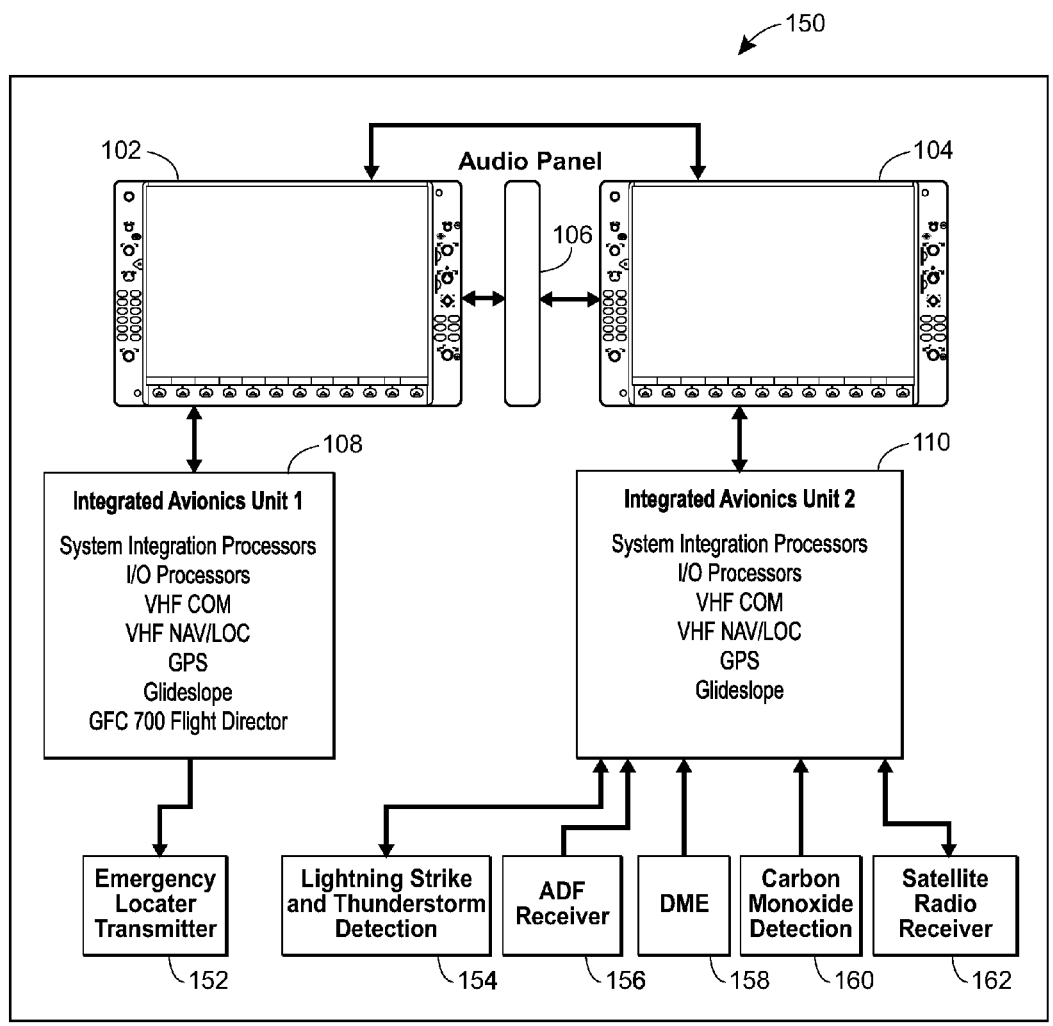
FIG. 1B is an illustration of a block diagram of an exemplary modified integrated flight deck system 150 in accordance with an embodiment of the present disclosure.

FIG. 1B is an illustration of a block diagram of an exemplary modified integrated flight deck system 150 in accordance with an embodiment of the present disclosure. In an embodiment, modified integrated flight deck system 150 includes the same LRUs shown in FIG. 1, but additionally includes emergency locator transmitter (ELT) LRU 152, lightning strike and thunderstorm detection LRU 154, automatic direction finder (ADF) LRU 156, distance measuring equipment (DME) LRU 158, carbon monoxide detection LRU 160, and satellite radio receiver LRU 162.

For purposes of simplicity, the various LRUs of initial integrated flight deck system 100, as shown in FIG. 1A, are not shown in FIG. 1B with the exception of primary LRU 102, secondary LRU 104, audio panel LRU 106, and integrated avionics unit LRUs 108 and 110. As shown in FIG. 1B, various new LRUs have been added to initial integrated flight deck system 100 to form modified integrated flight deck system 150. As will be further discussed with reference to FIG. 2 below, each of the new LRUs may be installed by connecting or inserting an external device (e.g., laptop, memory card, etc.) into primary LRU 102, in which case primary LRU 102 would copy to its internal memory the software and configuration data loaded to the new LRU, the details of other LRUs which were affected upon installation of the new LRU, and the time when the installation occurred.

For example, Emergency Locator Transmitter (ELT) LRU 152 may be installed. The appropriate hardware couplings (e.g., cabling, buses, interconnects, input, outputs, etc.) between integrated avionics unit LRU 108 and ELT LRU 152 may be in place prior to the physical installation of ELT LRU 152, but a technician or other user may need to initially locate the physical memory card to complete the installation process. To do so, the technician or other user may insert the proper external device into a memory card slot in primary LRU 102 (or secondary LRU 104), and in turn load the software and configuration data to ELT LRU 152 via communications with integrated avionics unit LRU 108. As part of this procedure, primary LRU 102 may also change the configuration data associated with one or more options or settings of integrated avionics unit LRU 108, so that integrated avionics unit LRU 108 and ELT LRU 152 may communicate with one another and relay the appropriate communications to primary LRU 102 and/or secondary LRU 104.

To provide another example, a user may install one or more of lightning strike and thunderstorm detection LRU 154, ADF LRU 156, DME LRU 158, carbon monoxide detection LRU 160, and/or satellite radio receiver LRU 162, each of which communicates with integrated avionics unit 110 and, in turn, with secondary LRU 104. When one of these LRUs is installed, the technician or other user may insert the proper external device into primary LRU 102 (or secondary LRU 104), which may load the software and configuration data to the installed LRU via secondary LRU 104 and integrated avionics unit LRU 110. Again, as part of this procedure, primary LRU 102 may also change the configuration data associated with one or more options or settings of secondary LRU 104 and/or integrated avionics unit LRU 110, so that integrated avionics unit LRU 110 and the newly installed LRU(s) may communicate with one another and relay the appropriate communications to primary LRU 102 and/or secondary LRU 104.

When a new LRU is installed via primary LRU 102, embodiments include primary LRU 102 copying to its internal memory the loaded configuration and software data from an external device, which may include any details identifying the affected LRUs within modified integrated flight deck system 150, the details associated with these changes, and/or the time when these changes occurred. This procedure may additionally or alternatively be repeated for any LRU installed as part of modified integrated flight deck system 150. For example, additional LRUs may be added to the initial integrated flight deck system 100 and/or LRUs from the initial integrated flight deck system 100 may later be replaced. In such instances, embodiments include primary LRU 102 copying to its internal memory the loaded configuration and software data from an external device used as each LRU is added or replaced.

Although the foregoing embodiments have been discussed above with reference to primary LRU 102, any LRU in an integrated system (which may include initial integrated flight deck system 100 or modified integrated flight deck system 150) may copy the software and configuration data as LRUs are added to an integrated system or replaced. As will be further discussed below with reference to FIGS. 2 and 3, embodiments include one or more memory devices (e.g., internal memory in LRU 102) within integrated system 100 (or more than one storing the data redundantly) building a list of the applicable software and configuration data changes made historically to one or more LRUs presently in an integrated flight deck system. For instance, in some embodiments, integrated avionics unit LRU 108 may store in an internal memory the software and configuration of integrated avionics unit LRU 110 and ELT LRU 152. In other embodiments, the integrated avionics unit LRU 108 may store in an internal memory the software and configuration of all other LRUs within initial integrated flight deck system 100 or modified integrated flight deck system 150. Again, the changes to initial integrated flight deck system 100 may include changes due to LRUs being added to initial integrated flight deck system 100 (to form modified integrated flight deck system 150), replacement of LRUs in either initial integrated flight deck system 100 or modified integrated flight deck system 150, or any modifications to LRUs in either initial integrated flight deck system 100 or modified integrated flight deck system 150 over time. Using this list, primary LRU 102 (or any other LRU in the integrated system) may "replay" the history of these loaded changes from the point when the replacement LRU was previously installed using the stored copy of the software and configuration data stored in memory, thereby automating the installation process and eliminating the need for a technician or other user to manually identify which external devices need to be loaded when an LRU is replaced.

Figure 2:
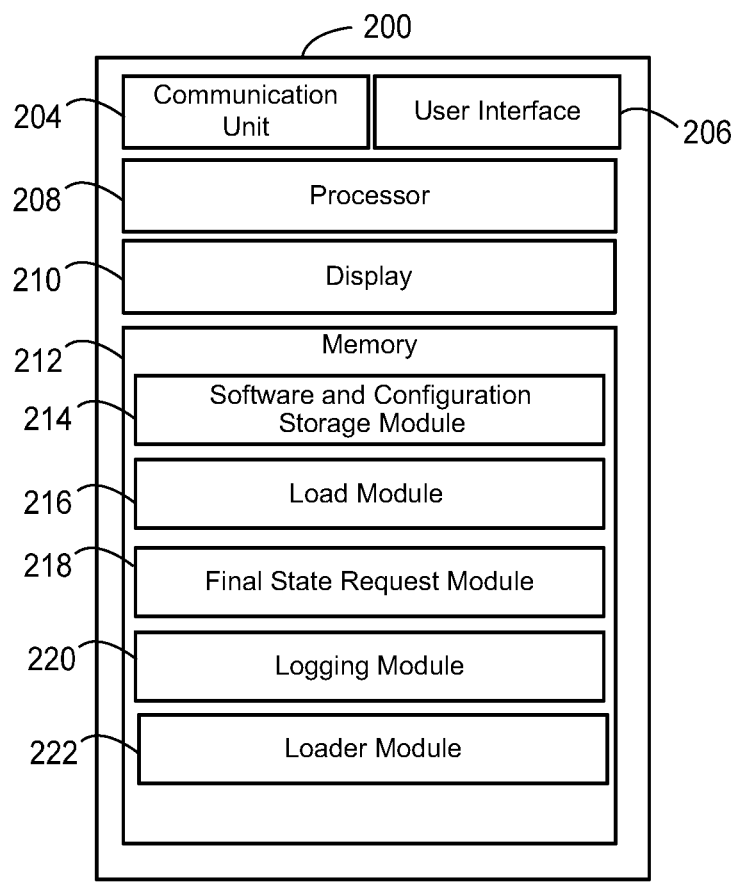
FIG. 2 is a schematic illustration example of a primary line replacement unit (LRU) 200 in accordance with an embodiment of the present disclosure.

FIG. 2 is a schematic illustration example of a LRU 200 in accordance with an embodiment of the present disclosure.

LRU 200 may be implemented as any suitable device that is utilized in conjunction with an integrated system that may include one or more LRUs. In various embodiments, LRU 200 may be an implementation of primary LRU 102 or secondary LRU 104, for example, as shown in FIGS. 1A-B.

In an embodiment, LRU 200 may include a communication unit 204, a user interface 206, a processor 208, a display 210, and a memory 212. LRU 200 may include additional elements to or fewer elements than those shown in FIG. 2.

Communication unit 204 may be configured to support any suitable number and/or type of communication protocols to facilitate communications between LRU 200 and one or more other LRUs and/or components that are monitored by LRU 200. Communication unit 204 may be configured to receive any suitable type of information from and/or transmit any suitable type of information to one or more LRUs installed as part of an integrated system that includes LRU 200. Communication unit 204 may be implemented with any suitable combination of hardware and/or software to facilitate this functionality. For example, communication unit 204 may be implemented with any number of wired and/or wireless transceivers, ports, connectors, etc.

Communication unit 204 may be configured to facilitate communications with various LRUs using various types of communication protocols. For example, communication unit 204 may facilitate communications between LRU 200 and another LRU via a wired Ethernet protocol. Communication unit 204 may be configured to support simultaneous or separate communications between LRU 200 and two or more LRUs.

User interface 206 may be configured to facilitate user interaction with LRU 200 and/or to provide feedback to a user. In an embodiment, a user may interact with user interface 206 to place LRU 200 into various modes of operation, to initiate certain functions, to modify settings, set options, perform load and/or installation procedures, etc., which are further discussed below with reference to FIGS. 4A-C.

For example, user interface 206 may include a user-input device such as an interactive portion of display 210 (e.g., one or more "soft" keys, buttons, menu options, etc.) displayed on display 210, extension of display 210 onto a mobile device (e.g., tablet computer, mobile phone, etc.) that is in wireless communication with initial integrated flight deck system 100 or modified integrated flight deck system 150, physical buttons integrated as part of LRU 200 that may have dedicated and/or multi-purpose functionality, etc. To provide another example, user interface 206 may cause visual notifications to be displayed via display 210 and/or audible notifications to be sounded. Audible notifications may be sounded via implementation of any suitable device, such as a buzzer, speaker, etc., which are not shown in FIG. 2 for purposes of simplicity.

Display 210 may be implemented as any suitable type of display configured to facilitate user interaction with LRU 200, such as a capacitive touch screen display, a resistive touch screen display, etc. In various aspects, display 200 may be configured to work in conjunction with user-interface 206 and/or processor 208 to detect user inputs upon a user selecting a displayed interactive icon or other graphic, the selection of a "soft" key, to identify user selections of various knobs, switches, buttons, objects displayed via display 210, etc.

Processor 208 may be implemented as any suitable type and/or number of processors, such as a host processor of LRU 200, for example. To provide additional examples, processor 208 may be implemented as an application-specific integrated circuit (ASIC), an embedded processor, a central processing unit (CPU) associated with LRU 200, a graphical processing unit (GPU), etc., or any combination thereof.

Processor 208 may be configured to communicate with one or more of communication unit 204, user interface 206, display 210, and/or memory 212 via one or more wired and/or wireless interconnections, such as any suitable number of data and/or address buses, for example. These interconnections are not shown in FIG. 2 for purposes of brevity.

Processor 208 may be configured to operate in conjunction with one or more of communication unit 204, user interface 206, display 210, and/or memory 212 to read data from one or more external devices and/or to perform various functions. These functions may include, for example, determining configuration and/or software data changes based upon the read data, copying data from an external device and storing this data in memory 212, and storing data in memory 212. This data may include, for example, a history of changes to configuration and software for each LRU with which LRU 200 communicates and/or a time at which these changes were made.

Additionally, the various functions performed by processor 208 in conjunction with one or more of communication unit 204, user interface 206, display 210, and/or memory 212 may include, for example, communicating with all LRUs (broadcast messages), identifying one or more LRUs by a unique identifier, retrieving data from memory 212 and/or using data stored in memory 212 to facilitate an LRU installation without requiring an external device to be used, and displaying information on display 210, and sending, receiving, processing, and/or interpreting data via communication unit 204. Still further, these functions may include, for example, processing and/or storing selections from user interactions via user interface 206, receiving data from and/or sending data to one or more LRUs, verifying that a load procedure has been completed, verifying data copied from an external device, etc.

In accordance with various embodiments, memory 212 may be a computer-readable non-transitory storage device that may include any suitable combination of volatile (e.g., a random access memory (RAM), or non-volatile memory (e.g., battery-backed RAM, FLASH, etc.). Memory 212 may be configured to store instructions executable on processor 208, such as the various memory modules illustrated in FIG. 2 and further discussed below, for example. These instructions may include machine readable instructions that, when executed by processor 208, cause processor 208 to perform various acts as described herein.

Software and configuration storage module 214 may be a region of memory 212 configured to store instructions, that when executed by processor 208, cause processor 208 to perform various acts in accordance with applicable embodiments as described herein.

In an embodiment, software and configuration storage module 214 may include instructions that, when executed by processor 208, cause processor 208 to store a copy of one or more external devices that have contributed to the configuration of the integrated system that includes several LRUs. For example, if the integrated system is used in an aircraft, as previously discussed with reference to FIGS. 1A-B, processor 208 may store a copy of the software and configuration content transferred from the external devices that contributed to the configuration of the aircraft through the installation of each of the individual LRUs. This may include, for example, external devices used in the factory configuration of LRUs, modifications to any installed LRUs, as well as new LRUs that were installed after the factory configuration.

Again, LRU 200 may be implemented as any LRU that is part of an integrated system. In an embodiment, processor 208 may use various copying techniques based upon the particular LRU that has been installed and/or the stage in which the integrated system of LRUs is configured. For example, when the integrated system is first configured (e.g., at the factory) with the initial LRUs, processor 208 may work in conjunction with load recording module 216 and/or final state request module 218 to copy the initial configuration data, software data, and/or registry data to memory 212 for one or more other LRUs in the integrated system (or all LRUs in the integrated system), which is further discussed in detail below. In such a scenario, processor 208 may execute instructions stored in software and configuration storage module 214 to detect the initiation of an installation process of another LRU (e.g., via user input, detection of a first time default configuration sequence being performed, etc.), and then continue to execute instructions in accordance with one or more of load recording module 216 and/or final state request module 218 to store the configuration and software data for that LRU (and additional LRUs as they are installed) in memory 212.

To provide another example, when LRU 200 is an LRU that is part of modified flight deck system 150 (e.g., a new LRU added to but not included in initial integrated flight deck system 100), then LRU 200 may copy the configuration data, software data, and/or any registry data that may be loaded to LRU 200 from an external device upon its installation. Once LRU 200 copies this data, the data may be broadcasted, pushed, or otherwise shared with other LRUs in the integrated system, which may store the data redundantly. In this way, the configuration data, software data, and/or registry data stored in one of the other LRUs may be accessed and used to install an LRU that is replacing LRU 200 without the use of an original external device. To facilitate this functionality, processor 208 may execute instructions stored in software and configuration storage module 214 and/or work in conjunction with user interface 206 to copy the configuration data, software data, and/or registry data that is loaded to LRU 200 as part of the installation process.

Thus, in an embodiment, when a new LRU is installed, a technician or other user or other user may not need to use an external device if the software and configuration data is already stored in memory 212 (or on a memory of another LRU in the integrated system). For example, if the software and configuration data for each of the initial external devices was stored in memory 212 upon the initial configuration of the integrated system and one of these initial LRUs later needs to be replaced, an external device may not be required. To bypass the use of an external device, the installation of the replacement LRU may be facilitated by potentially loading the configuration and software data previously copied and stored in memory 212 to a portion of memory in the replacement LRU that would ordinarily store data from the external device data to facilitate installation.

Therefore, in accordance with an embodiment, processor 208 may execute instructions stored in software and configuration storage module 214 to store, upon an LRU being installed to the integrated system, information identifying each currently installed LRU so that the copied data may be later correlated to a replacement LRU. That is, when replaced, processor 208 may identify the newly installed LRU as a replacement LRU and determine whether configuration and software data already resides in memory 212 to complete the load and installation without an external device. This identifying information may include any suitable information to later identify the LRU is of the same type, which may include, for example, a product identifier, a unique hardware address of the replacement LRU, etc.

To provide another example, because the replacement LRU may occupy the same physical LRU location within the integrated system, the replacement LRU may be assigned the network address (e.g., a physical network address, an internet protocol (IP) address, etc.) that was previously assigned to the LRU that was replaced. The network address may be, for example, based upon a physical location on the network and used by the LRUs to communicate with one another within the integrated system. In such a case, processor 208 may identify which LRUs in the system have not yet been configured, and lookup the address of the replacement LRU in memory 212 to determine whether the configuration and software data is already stored in memory 212. If the replacement LRU already has software and configuration data stored in memory 212, then processor 208 may prompt the user, via display 210, that this data does not need to be copied and/or that the data may be used in lieu of an external device. Otherwise, processor 208 may execute instructions stored in software and configuration storage module 214 to store the configuration and software data to memory 212 associated with the one or more external devices used to install the replacement LRU.

In some embodiments, processor 208 may provide a user with options via user interface 206 and/or display 210 to perform a force copy of the configuration and software data to memory 212 that is associated with an external device of the replacement LRU even when this data is already stored in memory 212. Such embodiments may be particularly useful, for example, when it is suspected or detected that data stored in memory 212 may be corrupt, a new software and configuration version(s) has been released, etc.

In an embodiment, processor 208 may execute instructions stored in software and configuration storage module 214 to verify the integrity of data after software and configuration data from an external device has been copied to memory 212 and/or to other LRUs in the integrated system. This verification may be performed using any suitable verification techniques. For example, processor 208 may perform an integrity check value comparison between the software and configuration data value associated with the external device used for an LRU load procedure and the copied software and configuration data value stored in memory 212. Because this data should be identical to avoid use of the external device for future LRU replacements, processor 208 may cause user interface 206 to issue a notification and/or warning via display 210 when these values do not match. For instance, processor 208 may a cause a warning notification to be issued on display 210 when a mismatch in software or configuration data values is determined to exist by processor 208 or processor of another LRU.

In some instances, the data stored in an external device may be encrypted. Therefore, embodiments may include software and configuration storage module 214 storing instructions that, when executed by processor 208, cause processor 208 to decrypt the data so the data may be loaded to the replacement LRU. Processor 208 may also encrypt the data as it is stored in memory 212 to protect the data and to utilize the same loading procedure from memory 212 that would be used for an external device if the LRU later needs to be replaced. In embodiments, processor 208 may compress the data to reduce the utilization of memory 212.

Load recording module 216 may be a region of memory 212 configured to store instructions, that when executed by processor 208, cause processor 208 to perform various acts in accordance with applicable embodiments as described herein.

In an embodiment, load recording module 216 may include instructions that, when executed by processor 208, cause processor 208 to record one or more user actions and pertinent data associated with the configuration data and software data of the integrated system that includes LRU 200 and various additional LRUs. In an embodiment, processor 208 may execute instructions stored in load recording module 216 to store this configuration and software data for the entire initial integrated system, for example, when configured in the factory. Processor 208 may execute the instructions stored in load recording module 216 to record one or more loading processes by storing data to memory 212 in parallel with each loading procedure being performed on each LRU in the initial integrated system.

In this way, LRU 200 may act as an installation recording device, storing a record of the initial load procedures at the factory to memory 212 and allowing a user to later "replay" this record to restore the initial integrated system. For example, if one of the initial LRUs configured with the system later needs to be replaced and new LRUs have not yet been added to the integrated system, it may be desirable to simply return the integrated system to its factory state. To provide additional examples, it may likewise be desirable to revert back to the factory state to troubleshoot issues, repair corrupted installations, etc.

Final state request module 218 may be a region of memory 212 configured to store instructions, that when executed by processor 208, cause processor 208 to perform various acts in accordance with applicable embodiments as described herein.

In an embodiment, final state request module 218 may include instructions that, when executed by processor 208, cause processor 208 to store a record of the initial load procedures used at the factory to memory 212, similar to the process described above with respect to processor 208 executing instructions stored in load recording module 216. However, instead of recording the configuration and software data for each LRU load procedure in parallel as each procedure is performed, processor 208 may execute instructions stored in final state request module 218 to request, via communication unit 204, a copy of the software and configuration data from each individual LRU once the load has completed. In accordance with such embodiments, these requests may not occur during the load process, but may instead occur after each loaded LRU has reached a final state. In embodiments, processor 208 may execute instructions to cause processor 208 to determine, and store in memory 212, any difference that may exist in the configuration and software data for each LRU.

This final state may be reported, for example, by each LRU in the initial integrated system as the load procedure completes, such as via a broadcasted message from each LRU, a handshaking procedure between LRU 200 and each LRU, etc. Once each LRU reaches its final state and the load procedure has completed, LRU 200 may store a copy of the final software and configuration data to memory 212. Similar to the load recording technique described above, this final state technique similarly allows LRU 200 to act as an installation recording device by storing a record of the initial load procedures at the factory to memory 212, allowing user to later "replay" this record to restore the initial integrated system.

Logging module 220 may be a region of memory 212 configured to store instructions, that when executed by processor 208, cause processor 208 to perform various acts in accordance with applicable embodiments as described herein.

In an embodiment, logging module 220 may include instructions that, when executed by processor 208, cause processor 208 to store a historical log of the configuration, software, and/or registry data loaded to each LRU after the initial integrated system configuration. For example, referring back to FIG. 1B, satellite radio receiver LRU 162 was added to the initial integrated flight deck system 100. Assuming that the installation of satellite radio receiver LRU 162 required a technician or other user to perform a load procedure via an external device, this load procedure may result in changes to the configuration and/or software data for other LRUs within the modified integrated flight deck system 150.

For example, continuing to refer back to FIG. 1B, integrated avionics unit LRU 110 may need to have specific options enabled to ensure the satellite radio signals are properly received, processed, and the audio routed to primary LRU 102 and/or secondary LRU 104 via audio panel 106. Additionally or alternatively, the installation of satellite radio receiver LRU 162 may require integrated avionics unit LRU 110 to be programmed with new software to handle these new audio processing functions. As other LRUs are added to the initial integrated flight deck system 100 over time, these additions to the integrated system may further compound the changes to other LRUs in the integrated system.

In an embodiment, processor 208 may execute instructions stored in logging module 220 such that a complete history of these changes are stored in memory 212 in addition to any copied data as each new LRU is added to the integrated system. For example, using the previous instance whereby satellite radio receiver LRU 162 was installed, processor 208 may store details such as, for example, an identification (e.g., a network address) of each LRU in the integrated system that was affected by the installation of satellite radio receiver LRU 162, what those changes were in terms of configuration data and software data, and/or a timestamp of when the installation occurred, for example. Embodiments may include processor 208 storing information related to the changes introduced to the integrated system as each new LRU is added, thereby storing the history of changes to the configuration of the integrated system in memory 212.

In various embodiments, processor 208 may store the history of changes to the integrated system configuration in memory 212 in any suitable format. For example, processor 208 may store in memory 212 data in the format of a table, the table including software and configuration data for LRU 200, each of the of initial LRUs as programmed in the factory, and the software, configuration data, and/or registry data changes due to one or more new LRUs, a description of each LRU that has been added to the integrated system, a date when each change took place, etc.

Regardless of the process used to copy configuration and software data, the particular software and configuration data copied to an LRU, or the logged details of each LRU installation, embodiments may include processor 208 storing a redundant copy of any portion or the entirety of this data to another LRU. For example, processor 208 may execute instructions stored in software and configuration storage module 214 to broadcast a copy of the entire software and configuration data, including the logged details of changes made to this initial configuration data upon a new LRU being installed, to another LRU upon the new LRU installation (or replacement LRU installation) being completed. To provide another example, LRU 200 may broadcast a copy of the initial configuration and software data once the integrated system has completed factory configuration.

In various embodiments, the data broadcasting may occur upon the installation of a new LRU being completed, upon confirmation that each LRU is installed as part of an initial configuration, etc. In an embodiment, LRU 200 may broadcast this data to another secondary LRU (e.g., secondary LRU 104 or another LRU in initial integrated flight deck system 100 or modified integrated flight deck system 150). In this way, even if LRU 200 is an implementation of primary LRU 102, primary LRU 102 may later be replaced in a similar manner as other LRUs in the integrated system without the use of an external device, with a few differences that are discussed further below.

In the case of the software and configuration data from an external device being backed up to a secondary LRU, embodiments may include the primary and the secondary LRU communicating with one another to synchronize the software and configuration data values for each copy of the data, which should match one another to verify the integrity of the copied data. This synchronization may occur, for example, via communication unit 204 after a backup process has been completed. Embodiments may include user interface 206 issuing a suitable notification via display 210 when the software and configuration data values do not match, indicating that the data on primary LRU 102 or secondary LRU 104 may be corrupt, unreliable, or otherwise in need of review or repair.

Loader module 222 may be a region of memory 212 configured to store instructions, that when executed by processor 208, cause processor 208 to perform various acts in accordance with applicable embodiments as described herein.

In an embodiment, loader module 222 may include instructions that, when executed by processor 208, cause processor 208 to push the data stored in memory 212 to a newly-installed LRU to facilitate loading of software and configuration data used by the new LRU as part of the installation procedure. For example, if a new LRU is replaced that has a copy of the necessary software and configuration data that is ordinarily stored in an external device copied and stored in memory 212 (e.g., one that was copied from the previous external device install procedure) then processor 208 may facilitate the installation of the replacement LRU from the copied software and configuration data stored in memory 212 instead of requiring the use of an external device. In an embodiment, a technician or other user may utilize user interface 206 and display 210 to facilitate this installation procedure, which is further discussed below with reference to FIGS. 4A-4C.

In various embodiments, the LRU installation procedure using the configuration and software data stored in memory 212 may utilize the logging data to determine which other LRUs may need to also be modified when the LRU is replaced. For example, if a satellite radio unit LRU is added to the initial system that includes an integrated avionics unit LRU, the integrated avionics LRU may need to be reconfigured with new configuration data and/or have its software updated. These changes would typically occur upon the installation of satellite radio LRU. If the integrated avionics unit LRU later needs to be replaced, the logged data will allow processor 208 to build the appropriate list of software and configuration data that includes those changes introduced from the installation of the satellite radio unit LRU, and incorporate these changes automatically when pushing the copied data stored in memory 212 to the replacement integrated avionics unit LRU. This process is further discussed below with reference to FIG. 3.

Figure 3:
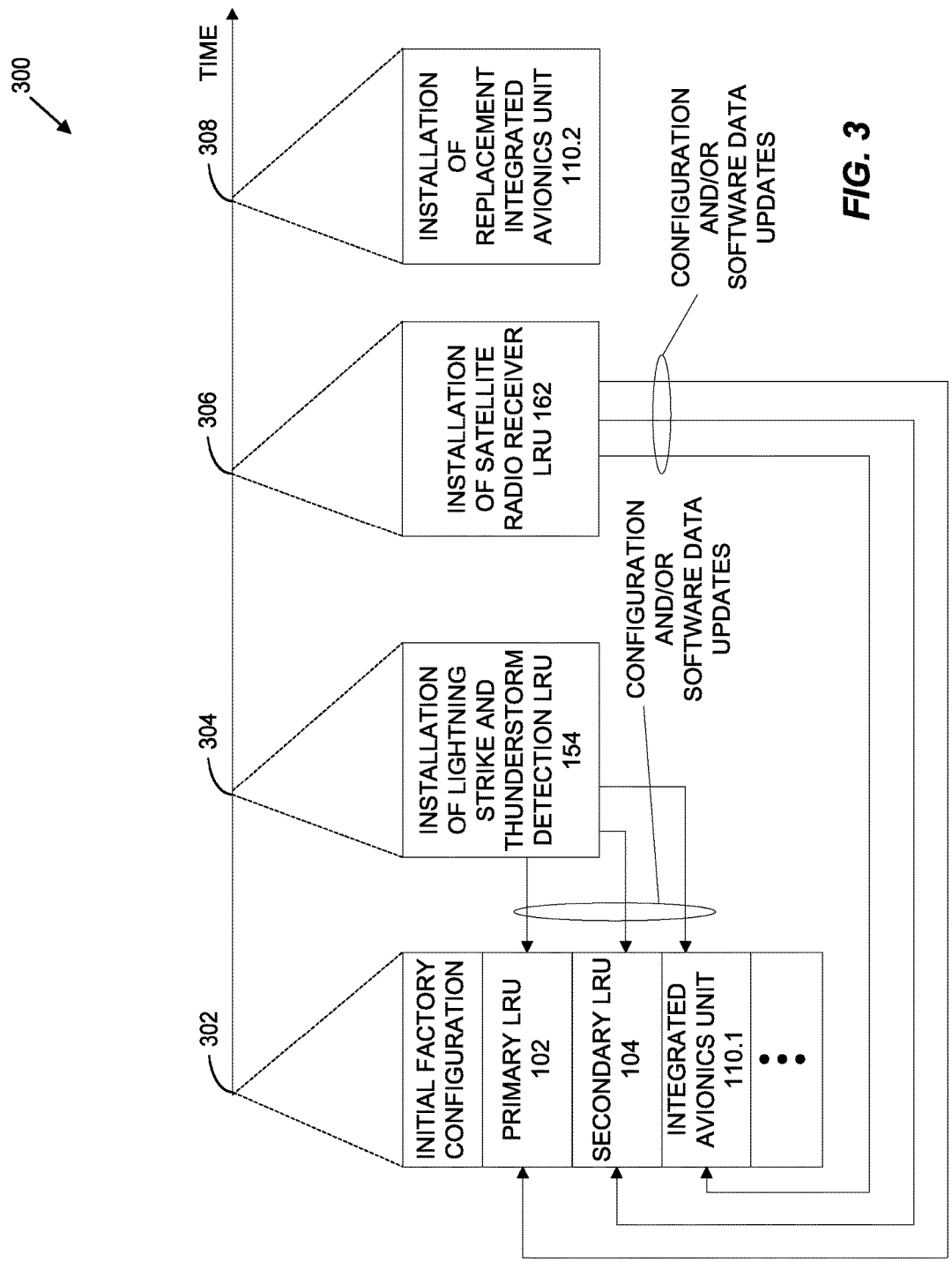
FIG. 3 illustrates an exemplary LRU software and configuration installation timeline 300 in accordance with an embodiment of the present disclosure.

FIG. 3 illustrates an exemplary LRU software and configuration installation timeline 300 in accordance with an embodiment of the present disclosure. As shown in FIG. 3, software and configuration installation timeline 300 indicates a timeline of LRU installations for an integrated system that includes several LRUs. In an embodiment, software and configuration installation timeline 300 may indicate when one or more LRUs from initial integrated flight deck system 100 and modified integrated flight deck system 150, as shown in FIGS. 1A-B, were installed.

For example, initial installation 302 may correspond to a time when initial integrated flight deck system 100 was initially configured at the factory. Initial installation 302 may include, for example, each of the LRUs shown in FIG. 1A being loaded with their proper software and configuration data.

Installation 304 may correspond to a time when a new LRU was added to initial integrated flight deck system 100, such as lightning strike and thunderstorm detection LRU 154, for example, as shown in FIG. 3. When lightning strike and thunderstorm detection LRU 154 is installed, a technician or other user may use an external device via primary LRU 102 to load configuration and software data to the new lightning strike and thunderstorm detection LRU 154. In doing so, the loading process may also alter the configuration and/or software data of initial integrated flight deck system 100 as installed at initial installation 302 to modified integrated flight deck system 150. For example, upon installing the new lightning strike and thunderstorm detection LRU 154, integrated avionics unit LRU 110.1 may require an update to configuration and/or software to process the new input from lightning strike and thunderstorm detection LRU 154, while primary LRU 102 may need new configuration data and/or software to display information used in conjunction with lightning strike and thunderstorm detection LRU 154, such as a map of imminent lightning strike locations, a notification when imminent lightning strikes are detected, etc.

Installation 306 may correspond to a time when a new LRU was added to modified integrated flight deck system 150, such as satellite radio receiver LRU 162, for example, as shown in FIG. 3. When satellite radio receiver LRU 162 is installed, a technician or other user may use an external device via primary LRU 102 to load configuration and software data to the new satellite radio receiver LRU 162. In doing so, the loading process may further alter the configuration and/or software data of modified integrated flight deck system 150 as installed at installation 304. For example, upon installing the new satellite radio receiver LRU 162, integrated avionics unit LRU 110.1 may require an update to configuration and/or software to process the new audio signals, route the audio signals, etc., while primary LRU 102 may require an update to configuration and/or software to provide a display of an interface utilized in conjunction with satellite radio receiver LRU 162, such as available channels, the content of each of the available channels, etc.

Installation 308 may correspond to a time when an LRU that was part of initial integrated flight deck system 100 (and later part of modified integrated flight deck system 150) needs to be replaced. For example, installation 308 may correspond to the installation of a replacement integrated avionics unit LRU 110.2, which replaces integrated avionics unit LRU 110.1. But reverting integrated avionics unit LRU 110.2 to the same state as integrated avionics unit LRU 110.1 during initial installation 302 would cause issues with the integrated system functioning in conjunction with lightning strike and thunderstorm detection LRU 154 and satellite radio receiver LRU 162, as changes were made to the software and configuration data of integrated avionics unit LRU 110 after each of these LRUs were added to the system, and these new LRUs are still part of this integrated system.

Therefore, embodiments may include processor 208 determining which LRUs were affected by the installation of the new lightning strike and thunderstorm detection LRU 154 and satellite radio receiver LRU 162. In this case, this would cause processor 208 to access memory 212 and determine, from the logged data stored to memory 212 upon each installation 304 and 306 being completed, that configuration changes had been made to the integrated avionics unit LRU 110 at each of these different installation times. Because the software and configuration data changes were stored in memory 212 when each of lightning strike and thunderstorm detection LRU 154 and satellite radio receiver LRU 162 was installed, embodiments may include processor 208 "replaying" these installation procedures by building a list of software and configuration data changes in addition to those from the initial installation 302. Processor 208 may then automatically load to the replacement integrated avionics unit LRU 110.2 the software and configuration data changes from each of the initial installation 302, installation 304, and installation 306 to facilitate the installation of the replacement integrated avionics unit LRU 110.2 without the use of an external device. In this way, upon the integrated avionics unit LRU 110.1 being replaced, the replacement integrated avionics unit LRU 110.2 would share identical configuration and software data as the original integrated avionics unit LRU 110.1 that was installed as part of the integrated system after installation 306 and prior to being replaced.

Figure 4A:
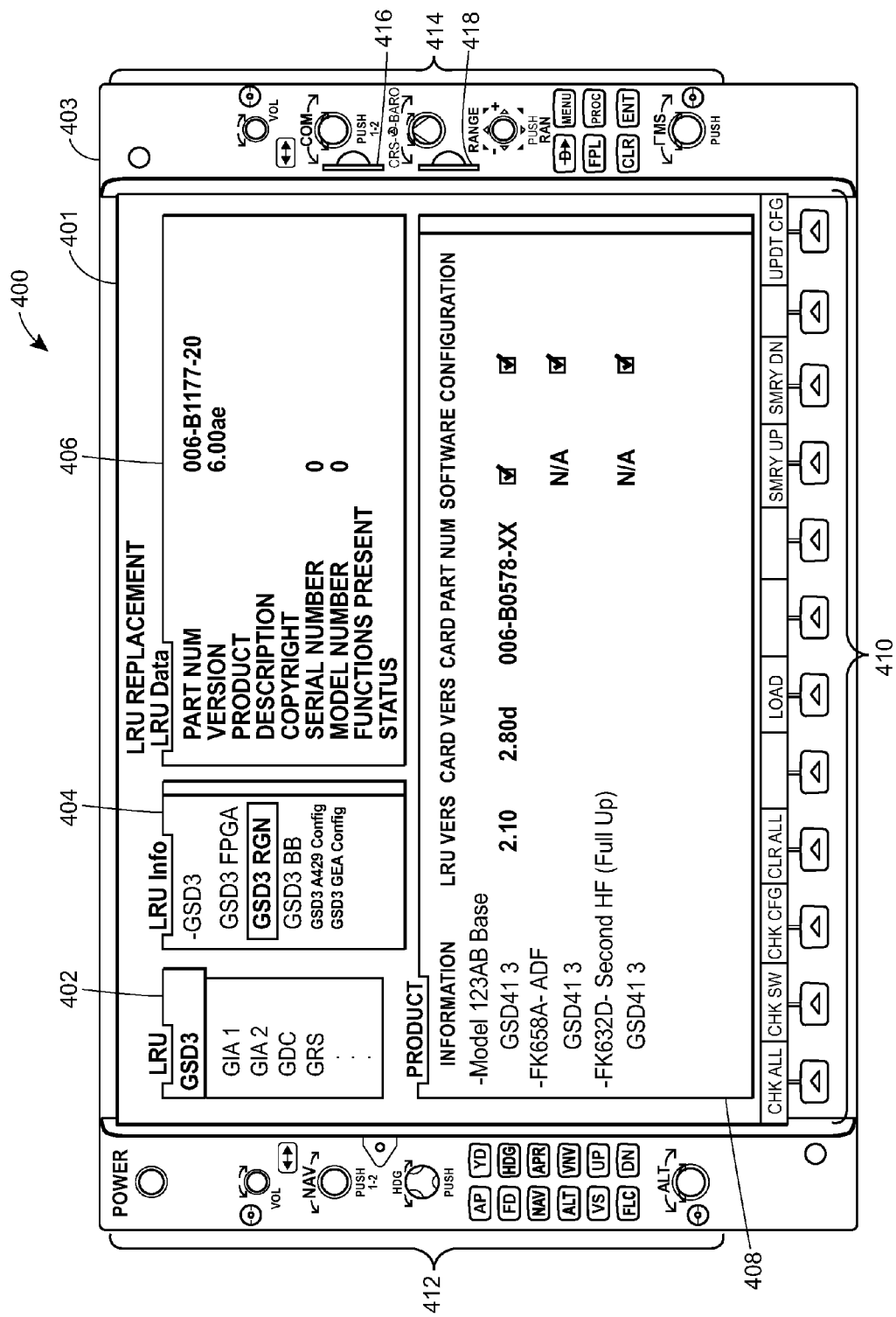
FIGS. 4A-4C are schematic illustration examples of screens presented on an LRU display and layout 400 corresponding to a flight display unit used to manage the storage of software and configuration data for a LRU in the integrated avionics system and the installation of the stored software and configuration data on a replacement LRU in accordance with embodiments of the present disclosure.

FIG. 4A is a schematic illustration example of an LRU display and layout 400 corresponding to a flight display unit used to facilitate an LRU replacement procedure in accordance with an embodiment of the present disclosure. In an embodiment, LRU display and layout 400 may include a display 401 and a housing 403. Display 401 may be displayed on any suitable display, such as display 210 of LRU 200, for example, as shown in FIG. 2.

As shown in FIG. 4A, display 401 may display various windows, which allow a user to view various options, menus, and/or other information to facilitate an LRU replacement procedure. For example, display 401 may include windows 402, 404, 406, and 408. Housing 403 may also include various buttons, dials, soft keys, etc., to allow user interaction with the LRU (e.g., LRU 200). For example, housing 403 may include navigation control panels 412 and 414, SD card slots 416 and 418, and soft key panel 410. In an embodiment, windows 402, 404, 406, and 408 in conjunction with navigation control panels 412 and 414, SD card slots 416 and 418, and soft key panel 410 may form a user interface, such as user interface 206, for example, as shown in FIG. 2.

In an embodiment, window 402 may function as an LRU drop down menu. In accordance with such an embodiment, window 402 may populate with all LRUs currently installed as part of the integrated system. A user may utilize one or more buttons and/or dials of navigation panels 412 and/or 414 (e.g., the "NAV" dial in navigation panel 412) to select an LRU that has been physically installed as a replacement. This populated list may additionally or alternatively include a list of LRU identifiers and/or addresses, including the subcomponents (e.g., internal hardware cards) or each LRU. As shown in FIG. 4A, window 402 includes a list of several LRUs for initial integrated flight deck system 100, as shown in FIG. 1A, which corresponds to a scenario in which a technician or other user has physically installed a replacement data aggregator (GSD3), and has selected this from the drop down list in window 402.

In an embodiment, windows 404 and 406 may function to display information about the selected LRU and/or LRU subcomponents. For example, window 404 may include information for the selected LRU (GSD3) and the subcomponents of that selected LRU. As a user navigates window 404 to select subcomponents of GSD3, various details may be displayed in window 406 regarding the selected LRU and/or selected subcomponent of the selected LRU. This information may include, for example, a part number, version number, product identifier, description, manufacturer, serial number, status, etc. In an embodiment, windows 404 and 406 may facilitate a user performing a manual boot block compatibility check on the replacement LRU.

In an embodiment, product window 408 may include information from stored configuration, software, and/or logged data stored in an internal memory of the LRU, as previously discussed. This data may be displayed in any suitable format, such as the Extensible Markup Language (XML) rows shown in FIG. 4A. Although FIG. 4A shows XML row entries, embodiments include the data being stored in memory in any suitable format and displayed and read in any suitable manner.

In an embodiment, window 408 may display only XML rows for each selected LRU component or subcomponent that are applicable to the replacement LRU. For example, as discussed with reference to FIG. 3, the selectable software and configuration options may be determined by referencing the table data stored in the internal memory of the LRU and displaying applicable portions of software and/or configuration data that may be loaded to the replacement LRU based upon the logged data and the particular LRU that is being replaced.

Window 408 may be displayed in any suitable format to facilitate loading software and/or configuration data from the internal memory of the LRU, which may have been copied and stored from a previous external device installation (e.g., via SD card slots 416 and/or 418). In an embodiment, window 408 may display this data in an identical manner or a similar manner as the original external card loading procedure was performed, thereby keeping the presentation of control in the hands of the original equipment manufacturer (OEM).

Soft key panel 410 may include various soft keys, which have functions that may change dynamically depending on the particular application that is currently being executed by a user. For example, soft key panel 410 may include soft keys assigned to functions of verifying both the software and configuration data for an installed LRU ("CHK ALL"), such as after a load procedure has completed, for example. Again, this verification may be performed by comparing software and configuration data from an installed replacement LRU to that stored in the internal memory of the primary LRU, for example. Soft key panel 410 may additionally or alternatively include other soft keys having various functions, such as a software only verification check ("CHK SW"), a configuration data only check ("CHK CFG") a command to erase the present configuration and software data for the selected LRU and to set the selected LRU to a default or factory state ("CLR ALL"), a soft key to facilitate loading the selected software and/or configuration data displayed in window 408 to the selected LRU and subcomponents of the selected LRU ("LOAD"), a soft key associated with a user confirming the current configuration data ("UPDT CFG"), etc.

As previously discussed with reference to FIG. 3, the "CLR ALL" command may perform a different function based upon the particular LRU that is replaced, such as localizing the command to the new replacement primary LRU and not propagating the changes to other LRUs when the replacement LRU is a primary LRU, for example.

Figure 4B:
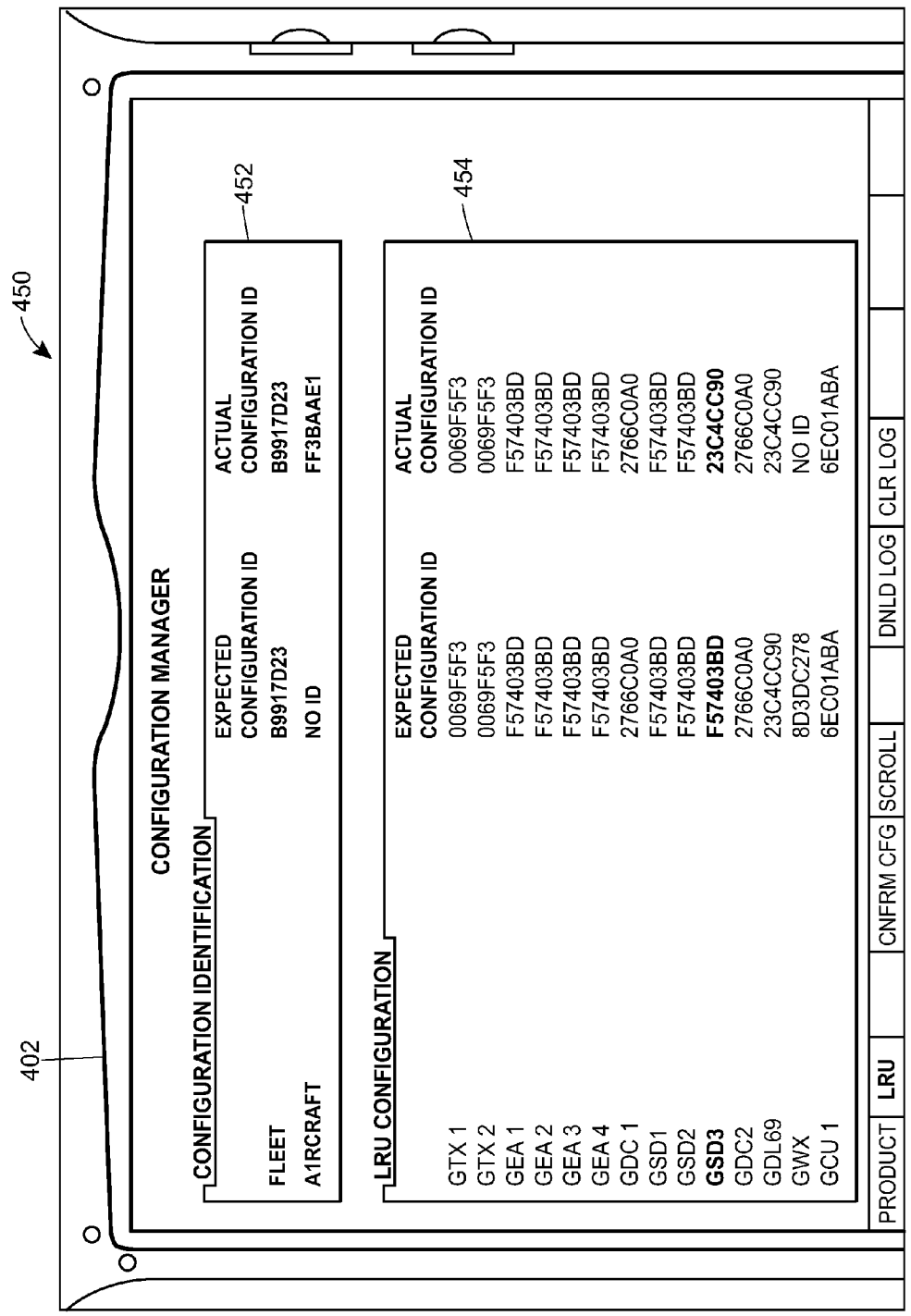
Figure 4C:
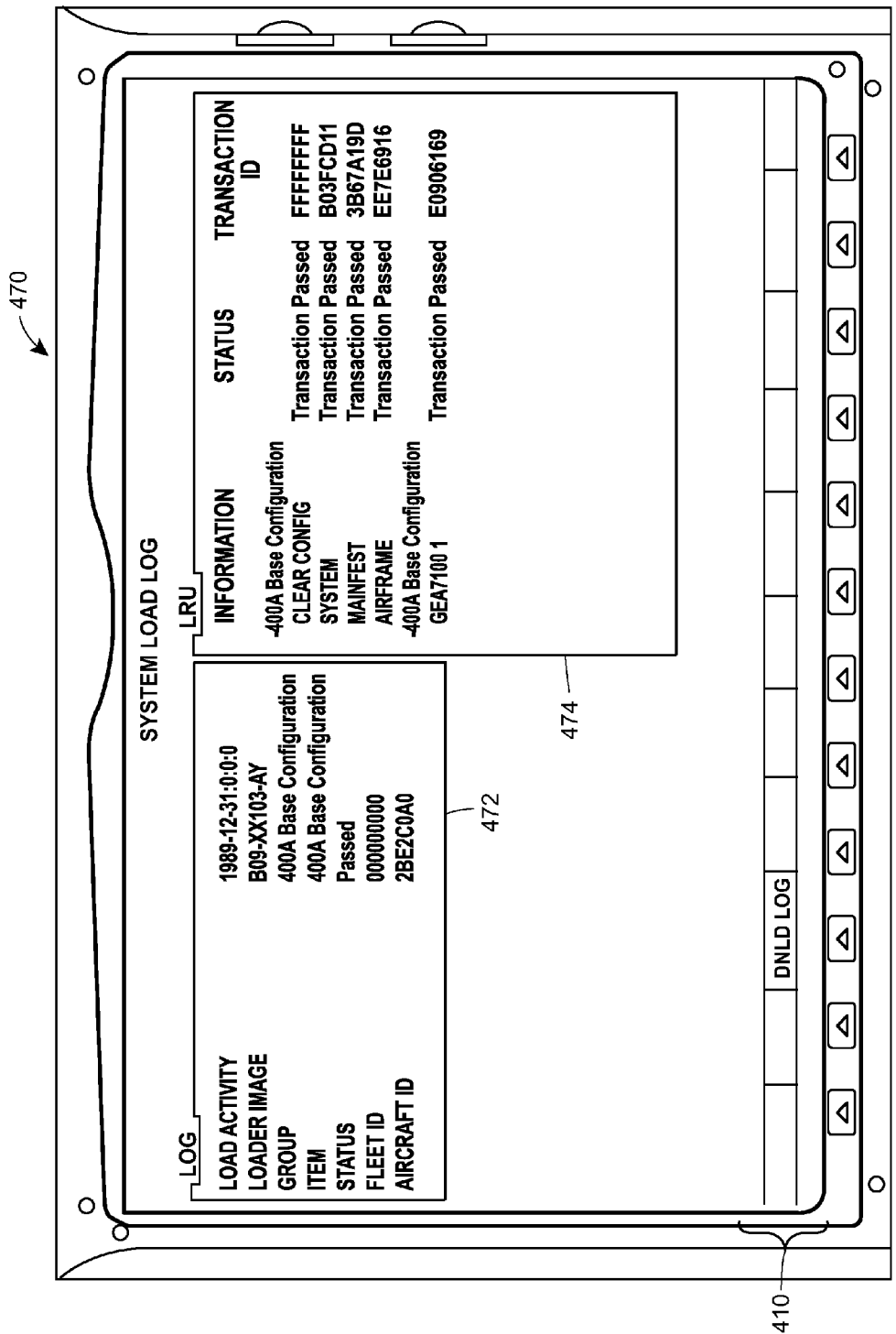

FIGS. 4B-4C are schematic illustration examples of screens corresponding to an LRU that is used as part of an LRU replacement procedure in accordance with an embodiment of the present disclosure. In an embodiment, the screens shown in FIGS. 4B-C may represent different exemplary views of what may be displayed on an LRU (e.g., primary LRU 102 or secondary LRU 104, as shown in FIGS. 1A-B) to facilitate various tasks related to the installation and/or replacement of an LRU.

In an embodiment, screen 450, titled "Configuration Manager" as shown in FIG. 4B, is an example of a screen that may be presented on display 401 for a selected LRU 104, as shown and discussed with reference to FIG. 4A, to enable a technician or other user or other user to quickly assess the configuration status of each LRU 104. In embodiments, screen 450 may be presented on display 401 in a configuration mode of the LRU 104. As shown in FIG. 4B, screen 450 presents a first window 452 and a second window 454. Screen 450 also includes a soft key panel 410, as previously discussed with reference to FIG. 4A. However, soft key panel 410, as shown in FIG. 4B, may associate or assign different functions to the soft keys beneath each function. The actual soft key buttons are not shown in FIG. 4B for purposes of brevity, but the functions assigned to each of these soft key buttons are further discussed below.

In an embodiment, first window 452 may include details regarding the configuration identification for an entire aircraft or other integrated system, while second window 454 may include the details regarding configuration data for specific LRUs that are part of the integrated system. As a result, a technician or other user or other user may utilize configuration IDs presented in first window 452 to determine the configuration status of the system as a whole. The second window 454 may present configuration IDs for each LRU 104 to enable the technician or other user or other user to determine the configuration status of each LRU 104 within the integrated system.

For example, the configuration IDs shown in FIG. 4B may correspond to a hash of the configuration data, versions of software and configuration data, etc. The configuration IDs shown in first window 452 may include a version of the present software and configuration data loaded on each LRU 104 within the integrated aircraft system. Because the configuration data on one or more LRUs 104 may change after the initial configuration, the configuration data currently loaded on the LRUs may be different than the initial configuration. The configuration data shown in second window 454, on the other hand, may include a current version of the software and configuration data corresponding to each LRU and/or LRU subcomponent within the integrated aircraft system.

In an embodiment, a technician or other user or other user may reference or access the configuration manager to view the configuration data for one or more LRUs prior to an LRU being replaced. For example, as shown in second window 454, the GSD3 LRU, which was selected in FIG. 4A, has a configuration ID that does not match the expected configuration ID value (i.e., the actual configuration ID does not match the expected configuration ID for the selected LRU). In embodiments, the second window 454 may provide a comparison result to aid the technician or other user or other user with identifying any configurations of interest. For instance, in embodiments, processor 208 may analyze the loaded configuration to present a "synchronized" or "unsynchronized" status for each LRU in second window 454. In such embodiments, the technician or other user or other user is not required to visually compare each configuration ID value to identify LRUs that may need to be serviced to include the expected software. A technician or other user may use this information as a guide to identify which LRU needs to be selected from the drop down menu in window 402, for example, as previously shown in FIG. 4A, for servicing.

Upon completing the loading procedure, the configuration and software data stored in the internal memory of the primary LRU may be pushed to the GSD3 LRU to complete the installation of the replacement GSD3, and the actual configuration ID and expected configuration ID values may then match, thereby verifying the load procedure was successful and that the replacement GSD3 has been loaded with the desired configuration and software data.

To provide another example, a user may select the "CNFRM CFG" soft key function to update the "Expected Configuration ID" value displayed in window 452 to match the current "Actual Configuration ID," select the "SCROLL" soft key function to scroll through the configuration information shown in second window 454 when this data takes up rows in excess of what may be displayed in a single window view. To provide an additional example, a user may select the "DNLD LOG" soft key function to facilitate a download of a log containing the data displayed on this page at the end of each installation activity. This data may provide helpful information when troubleshooting maintenance performed on an aircraft. To provide yet another example, a user may select the "CLR LOG" soft key function to clear the logged data stored in the internal memory of the primary LRU relating to the installation activities.

As shown in FIG. 4C, screen 470 titled "System Load Log" may include first window 472 and second window 474, and soft key panel 410, which includes a soft key function labeled "DNLD LOG." In an embodiment, screen 470, as shown in FIG. 4C, is an example of a screen that may be displayed on display 401 in response to a user navigating to the System Load Log page in configuration mode.

In an embodiment, first window 472 may include a log of loaded activity data for the entire integrated system of LRUs, while second window 474 may include a log of load activity data for one or more specific LRUs or LRU subcomponents. For example, first window 472 may include a date and time when the entire integrated system was initially installed and/or programmed, data identifying the image for the factory installation, the status of a recent verification, an aircraft (or other vehicle) ID, a fleet ID, a manufacturer ID, a description of the present configuration, etc.

In an embodiment, second window 474 may include information similar to first window 472, but directed to an individual LRU within the integrated system. For example, first window 472 may provide information related to overall maintenance activity (similar to a summary) and second window 474 may provide expanded information for the overall maintenance activity (e.g., information relating to each step in the maintenance process). In embodiments, second window 474 may indicate a history of configuration events for a selected LRU, such as an initial configuration loading procedure being completed, configuration data being cleared for the entire system and/or for a specific LRU, changes made to the configuration data due to other LRUs being installed into the initial integrated system that may impact the selected LRU, etc. A processor 208 may utilize the transaction ID of a loading event to validate and confirm that the expected LRU configuration was successfully loaded to the LRU. In embodiments, the information presented within second window 474 may be sorted in chronological order, where the most recent configuration is presented at the top of second window 474 and the oldest configuration is presented at the bottom of second window 474.

In an embodiment, the DNLD LOG soft key function may be selected by a user to download one or more portions of the load log that may be viewed via windows 472 and/or 474. Additionally or alternatively, a user may utilize the DNLD LOG soft key function to download an encrypted copy of one or more external devices used to load the integrated system, which may include software and configuration content for the initial configuration data and/or additional content used as additional LRUs were installed to the integrated system, as previously discussed with reference to FIG. 3.

Figure 5:
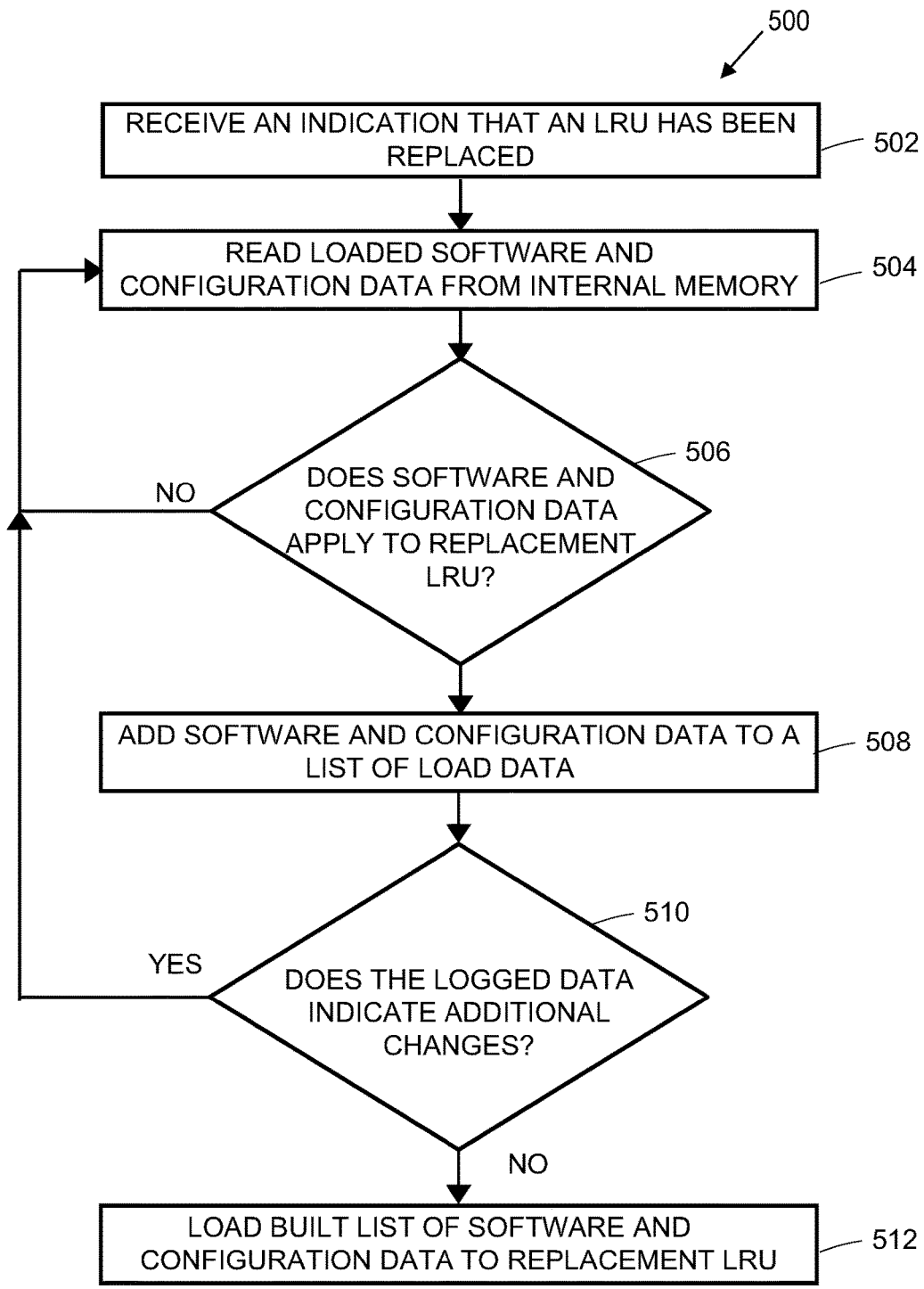
FIG. 5 illustrates a method flow 500, according to an embodiment.

FIG. 5 illustrates a method flow 500, according to an embodiment. In an embodiment, one or more regions of method 500 (or the entire method 500) may be implemented by any suitable device. For example, one or more regions of method 500 may be performed by primary LRU 102 or secondary LRU 104, as shown in FIG. 1. To provide another example, one or more regions of method 500 may be performed by LRU 200, as shown in FIG. 2.

Method 500 may start when one or more processors receive an indication that an LRU has been replaced (block 502). This indication may include, for example, a user input received via a primary LRU user interface, as previously discussed with reference to FIGS. 4A-4C. For example, a user may determine, based upon a mismatch in configuration IDs, that an LRU has been replaced and select this LRU from a drop down list, such as the list shown in window 402 of FIG. 4A, for example (block 502).

Method 500 may include one or more processors reading loaded software and/or configuration data stored in the internal memory of the device in which method 500 is implemented (block 504). For example, if method 500 is implemented in LRU 200, as discussed with reference to FIG. 2, processor 208 may read the logged configuration data from memory 212 of LRU 200 (block 504). This logged data may include, for example, a list of when various LRUs were added to the integrated system and/or replaced (block 504). For example, as previously discussed with reference to FIG. 3, the logged data may indicate the software and/or configuration data changes to the initial integrated system LRUs due to the installation of additional LRUs (block 504).

Method 500 may include one or more processors determining which of the software and configuration data from the logged data applies to the replacement LRU (block 506). For example, as previously discussed with reference to FIG. 3, the integrated avionics unit 110 was replaced after lightning strike and thunderstorm detection unit LRU 154 and satellite radio receiver LRU 162 were each installed. Method 500 may include one or more processors determining the updates introduced to the previous integrated avionics unit 110 from the logged data stored in memory 212 (block 506). That is, the software and configuration data may include copies of configuration and/or software data from external devices that were used to install other LRUs into the integrated system, which impacted the functionality of the LRU that is being replaced (block 506).

This logged data may be stored in a table format, for example, such that an identity of each LRU may be correlated with the changes made and the time when the changes were made, together with any applicable software and configuration data copies. Method 500 may include determining these changes by identifying those applicable to the replacement LRU based upon the LRU that is being replaced (block 506). When the one or more processors identify an applicable portion of the software and configuration data from the logged data for the replacement LRU, method 500 continues to add this data to a list that is built that will include the complete list of load data for the replacement LRU (block 508). Otherwise, method 500 continues to search for additional applicable portions within the logged data (block 504).

Method 500 may include one or more processors building the list of software and/or configuration data for a selected LRU that is being replaced (block 508). This load list may include, for example, changes made to the previous LRU that are to be carried over to the replacement LRU, such as the replacement integrated avionics unit 110, for example, as discussed with reference to FIG. 3 (block 508).

Method 500 may include one or more processors reading through the logged data to identify additional changes in the software and configuration data applicable to the replacement LRU (block 510). For example, if the logged data is stored in a table format in memory 212, then method 500 may include one or more processors reading through each table entry applicable to the replacement of the selected LRU (block 510). After each entry is read and the applicability of the software and/or configuration data for the replacement LRU is determined, the list is then completely built. Until the list is completely built, method 500 may continue to read through the table of logged data (block 504) until the logged data is read and no more changes are found (block 512). In an embodiment, the list of configuration and software data to be loaded may be displayed to a user for a selected replacement LRU, such as the list shown in window 408 of FIG. 4A, for example.

Method 500 may include one or more processors loading the software and configuration data stored in the internal memory of the device in which method 500 is implemented (block 512). Using FIG. 4A as an example, method 500 may include a user selecting the "LOAD" function via soft key panel 408, thereby loading the built list of configuration and software data in window 408 to the replacement LRU identified as GSD3 (block 512). Upon the load process being completed, the replacement LRU may be added to the system with the same configuration settings, options, and/or software as the LRU that it replaced without the use of an external device.

Throughout the disclosure the terms "new" and "replacement" are used to describe the condition or status of an LRU that may be installed to an integrated system. These terms should not be considered limiting, as every LRU that is added to an initial integrated system may be considered a new LRU, regardless of whether it is replacing an existing LRU or is added to the initial integrated system. However, as an example, the term "new LRU" may be used to describe one that has been added to the initial integrated system (e.g., those added to initial integrated flight deck system 100 to form modified integrated flight deck system 150). Continuing this example, the term "replacement LRU" may be used to describe an LRU that has been replaced with the same type of LRU after failure (e.g., when any of the LRUs in initial integrated flight deck system 100 or modified integrated flight deck system 150 is replaced).

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

What is claimed is:

1. A first line replaceable unit (LRU) from among a plurality of initial LRUs, the first LRU and each of the plurality of initial LRUs forming an initial integrated avionics system, the first LRU comprising:
   a communication unit configured to receive an indication that a newly-installed second LRU has been added to the plurality of initial LRUs to form a modified integrated avionics system including the first LRU, the second LRU, and the plurality of initial LRUs;
   a processor configured to log changes introduced to the initial integrated avionics system due to the installation of the second LRU including a time when the second LRU was installed and software and configuration data loaded to the second LRU upon its installation; and
   a memory configured to store the logged changes including changes to software and configuration data for the first LRU and each of the plurality of initial LRUs due to the second LRU being installed,
   wherein the processor is further configured, upon an LRU included in the modified integrated system being replaced with a third LRU, to build a list of software and configuration data corresponding to the third LRU using the stored logged changes in the software and configuration data for the LRU that was replaced with the third LRU, and to load to the third LRU the list of software and configuration data from the memory to facilitate installation of the third LRU.

2. The first LRU of claim 1, wherein:
   the second LRU is from among a plurality of newly-installed LRUs,
   the processor is further configured to track changes introduced to the initial integrated system due to the installation of each of the plurality of newly-installed LRUs including a time when each of the plurality of newly-installed LRUs was installed and software and configuration data loaded to each of the plurality of newly-installed LRUs upon installation.

3. The first LRU of claim 2, wherein the memory is further configured to store the logged changes including software and configuration data for each of the plurality of newly-installed LRUs.

4. The first LRU of claim 3, wherein the processor is further configured to build the list of software and configuration data by correlating (i) an identification of each of the plurality of newly-installed LRUs, (ii) a time when each of the plurality of newly-installed LRUs was installed, and (iii) the software and configuration data loaded to each of the plurality of newly-installed LRUs upon installation.

5. The first LRU of claim 3, wherein the processor is further configured to build the list of software and configuration data by determining, for each time when one of the plurality of newly-installed LRUs was installed, only software and configuration data changes for the third LRU.

6. The first LRU of claim 1, wherein the software and configuration data, upon being installed to the third LRU, facilitates operation of the third LRU in conjunction with the modified integrated system.

* * * * *